US012659856B2

(12) United States Patent
Zhang et al.

(10) Patent No.: US 12,659,856 B2
(45) Date of Patent: Jun. 16, 2026

(54) NON-PERIODIC C-DRX SCHEDULE SOLUTION FOR SIDELINK COMMUNICATIONS

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 18/006,514

(22) PCT Filed: Sep. 21, 2020

(86) PCT No.: PCT/CN2020/116467
§ 371 (c)(1),
(2) Date: Jan. 23, 2023

(87) PCT Pub. No.: WO2022/056906
PCT Pub. Date: Mar. 24, 2022

(65) Prior Publication Data
US 2024/0015648 A1      Jan. 11, 2024

(51) Int. Cl.
*H04W 52/02*      (2009.01)
*H04W 76/23*      (2018.01)
*H04W 76/28*      (2018.01)

(52) U.S. Cl.
CPC ....... *H04W 52/0216* (2013.01); *H04W 76/23* (2018.02); *H04W 76/28* (2018.02)

(58) Field of Classification Search
CPC . H04W 52/0216; H04W 76/23; H04W 76/28; H04W 92/18; Y02D 30/70
See application file for complete search history.

(56) References Cited

U.S. PATENT DOCUMENTS

| | | | | |
|---|---|---|---|---|
| 9,992,744 | B2 * | 6/2018 | Jha | H04W 52/0241 |
| 2013/0114484 | A1 * | 5/2013 | Suzuki | H04W 68/025 |
| | | | | 370/329 |
| 2017/0181218 | A1 | 6/2017 | Liu et al. | |
| 2019/0059054 | A1 * | 2/2019 | Lee | H04L 5/005 |
| 2020/0107266 | A1 * | 4/2020 | Liao | H04W 76/28 |
| 2020/0296783 | A1 * | 9/2020 | Su | H04W 76/14 |
| 2021/0297842 | A1 * | 9/2021 | Shrivastava | H04W 28/24 |
| 2022/0039009 | A1 * | 2/2022 | Iyer | H04L 5/0098 |

(Continued)

FOREIGN PATENT DOCUMENTS

CN          108377537 A      8/2018

OTHER PUBLICATIONS

Intel Corporation et al., "DRX in Side Link", 3GPP TSG RAN WG2 Meeting #96, R2-167764, 3rd Generation Partnership Project, Mobile Competence Centre, 650, Route Des Lucioles, F-06921 Sophia-Antipolis Cedex, France, vol. RAN WG2, No. Reno, USA, Nov. 14, 2016-Nov. 18, 2016 Nov. 5, 2016, XP051192833, 2 Pages.

(Continued)

*Primary Examiner* — Kibrom T Hailu
(74) *Attorney, Agent, or Firm* — Dinsmore & Shohl LLP

(57)          ABSTRACT
Certain aspects of the present disclosure provide techniques for enhancing sidelink connected discontinuous reception (C-DRX) modes by allowing non-periodic C-DRX transmission/reception occasions to be assigned.

24 Claims, 11 Drawing Sheets

(56) References Cited

U.S. PATENT DOCUMENTS

| | | | | |
|---|---|---|---|---|
| 2023/0247554 A1* | 8/2023 | Yoshioka | .............. | H04W 92/18 |
| | | | | 370/318 |
| 2024/0292485 A1* | 8/2024 | Yang | .................... | H04W 72/25 |

OTHER PUBLICATIONS

Intel Corporation: "Introduction of DRX Over PC5", 3GPP Draft, 3GPP TSG RAN WG2 Meeting #95bis, R2-166255, 3rd Generation Partnership Project (3GPP), Mobile Competence Centre, 650, Route Des Lucioles, F-06921 Sophia-Antipolis Cedex, France, vol. RAN WG2, No. Kaohsiung, Oct. 10, 2016-Nov. 14, 2016, Oct. 9, 2016 (Oct. 9, 2016), XP051150850, 2 pages, p. 1 last paragraph, p. 2 option 2, the whole document.
International Search Report and Written Opinion—PCT/CN2020/116467—ISA/EPO—Jun. 18, 2021.

\* cited by examiner

300

800

802

ASSIGN ONE OR MORE NON-PERIODIC CONNECTED DISCONTINUOUS RECEPTION (C-DRX) OCCASIONS TO A SECOND UE FOR SIDELINK COMMUNICATIONS BETWEEN THE FIRST AND SECOND UES

804

EXIT FROM A REDUCED POWER STATE IN ACCORDANCE WITH THE ASSIGNED ONE OR MORE NON-PERIODIC C-DRX OCCASIONS TO ENGAGE IN SIDELINK COMMUNICATIONS FROM THE SECOND UE

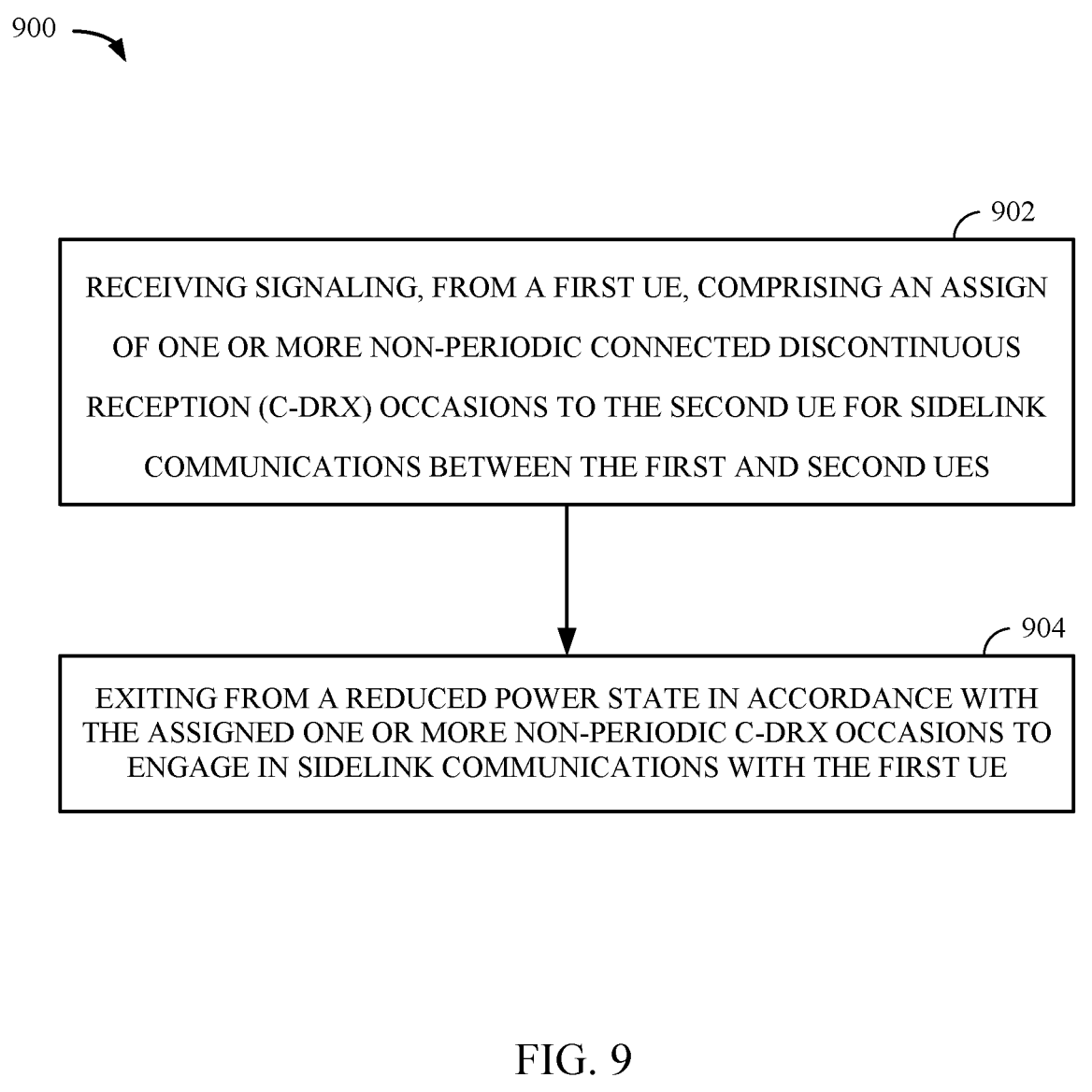

900

902

RECEIVING SIGNALING, FROM A FIRST UE, COMPRISING AN ASSIGN OF ONE OR MORE NON-PERIODIC CONNECTED DISCONTINUOUS RECEPTION (C-DRX) OCCASIONS TO THE SECOND UE FOR SIDELINK COMMUNICATIONS BETWEEN THE FIRST AND SECOND UES

904

EXITING FROM A REDUCED POWER STATE IN ACCORDANCE WITH THE ASSIGNED ONE OR MORE NON-PERIODIC C-DRX OCCASIONS TO ENGAGE IN SIDELINK COMMUNICATIONS WITH THE FIRST UE

FIG. 9

NON-PERIODIC C-DRX SCHEDULE SOLUTION FOR SIDELINK COMMUNICATIONS

CROSS-REFERENCE TO RELATED APPLICATIONS

This application is a national stage application under 35 U.S.C. 371 of PCT/CN2020/116467, filed Sep. 21, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for coordinating a sidelink discontinuous reception (DRX) mode between user equipments (UEs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a first user equipment (UE). The method generally includes assigning one or more non-periodic connected discontinuous reception (C-DRX) occasions to a second UE for sidelink communications between the first and second UEs and exiting from a reduced power state in accordance with the assigned one or more non-periodic C-DRX occasions to engage in sidelink communications from the second UE.

Certain aspects provide a method for wireless communications by a second UE. The method generally includes receiving signaling, from a first UE, comprising an assignment of one or more non-periodic connected discontinuous reception (C-DRX) occasions to the second UE for sidelink communications between the first and second UEs and exiting from a reduced power state in accordance with the assigned one or more non-periodic C-DRX occasions to engage in sidelink communications with the first UE.

Certain aspects provide a method for wireless communications by a first user equipment (UE). The first UE generally includes at least one antenna, means for assigning, via the at least one antenna, one or more non-periodic connected discontinuous reception (C-DRX) occasions to a second UE for sidelink communications between the first and second UEs, and means for exiting from a reduced power state in accordance with the assigned one or more non-periodic C-DRX occasions to engage in sidelink communications from the second UE.

Certain aspects provide a method for wireless communications by a second user equipment (UE). The second UE generally includes at least one antenna, means for receiving, via the at least one antenna, signaling, from a first UE, comprising an assignment of one or more non-periodic connected discontinuous reception (C-DRX) occasions to the second UE for sidelink communications between the first and second UE, and means for exiting from a reduced power state in accordance with the assigned one or more non-periodic C-DRX occasions to engage in sidelink communications with the first UE.

Certain aspects provide a method for wireless communications by a first user equipment (UE). The first UE generally includes at least one antenna and a processing system configured to assign, via the at least one antenna, one or more non-periodic connected discontinuous reception (C-DRX) occasions to a second UE for sidelink communications between the first and second UEs and exit from a reduced power state in accordance with the assigned one or more non-periodic C-DRX occasions to engage in sidelink communications from the second UE.

Certain aspects provide a method for wireless communications by a second user equipment (UE). The second UE generally includes at least one antenna, a receiver configured to receive signaling, from a first UE via the at least one antenna, comprising an assignment of one or more non-periodic connected discontinuous reception (C-DRX) occasions to the second UE for sidelink communications between the first and second UEs, and a processing system configured to exit from a reduced power state in accordance with the assigned one or more non-periodic C-DRX occasions to engage in sidelink communications with the first UE.

Certain aspects provide an apparatus for wireless communications by a first UE. The apparatus generally includes a processing system configured to assign, via the at least one antenna, one or more non-periodic connected discontinuous reception (C-DRX) occasions to a second UE for sidelink communications between the first and second UEs and exit from a reduced power state in accordance with the assigned one or more non-periodic C-DRX occasions to engage in sidelink communications from the second UE.

Certain aspects provide an apparatus for wireless communications by a second UE. The apparatus generally includes an interface configured to obtain signaling, from a first UE via the at least one antenna, comprising an assignment of one or more non-periodic connected discontinuous reception (C-DRX) occasions to the second UE for sidelink communications between the first and second UEs and a processing system configured to exit from a reduced power state in accordance with the assigned one or more non-periodic C-DRX occasions to engage in sidelink communications with the first UE.

Certain aspects provide a computer-readable medium for wireless communications by a first UE. The computer-readable medium generally includes codes executable to assign one or more non-periodic connected discontinuous reception (C-DRX) occasions to a second UE for sidelink communications between the first and second UEs and exit from a reduced power state in accordance with the assigned one or more non-periodic C-DRX occasions to engage in sidelink communications from the second UE.

Certain aspects provide a computer-readable medium for wireless communications by a second UE. The computer-readable medium generally includes codes executable to obtain signaling, from a first UE, comprising an assignment of one or more non-periodic connected discontinuous reception (C-DRX) occasions to the second UE for sidelink communications between the first and second UEs and exit from a reduced power state in accordance with the assigned one or more non-periodic C-DRX occasions to engage in sidelink communications with the first UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a flow diagram illustrating example operations that may be performed by a second UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
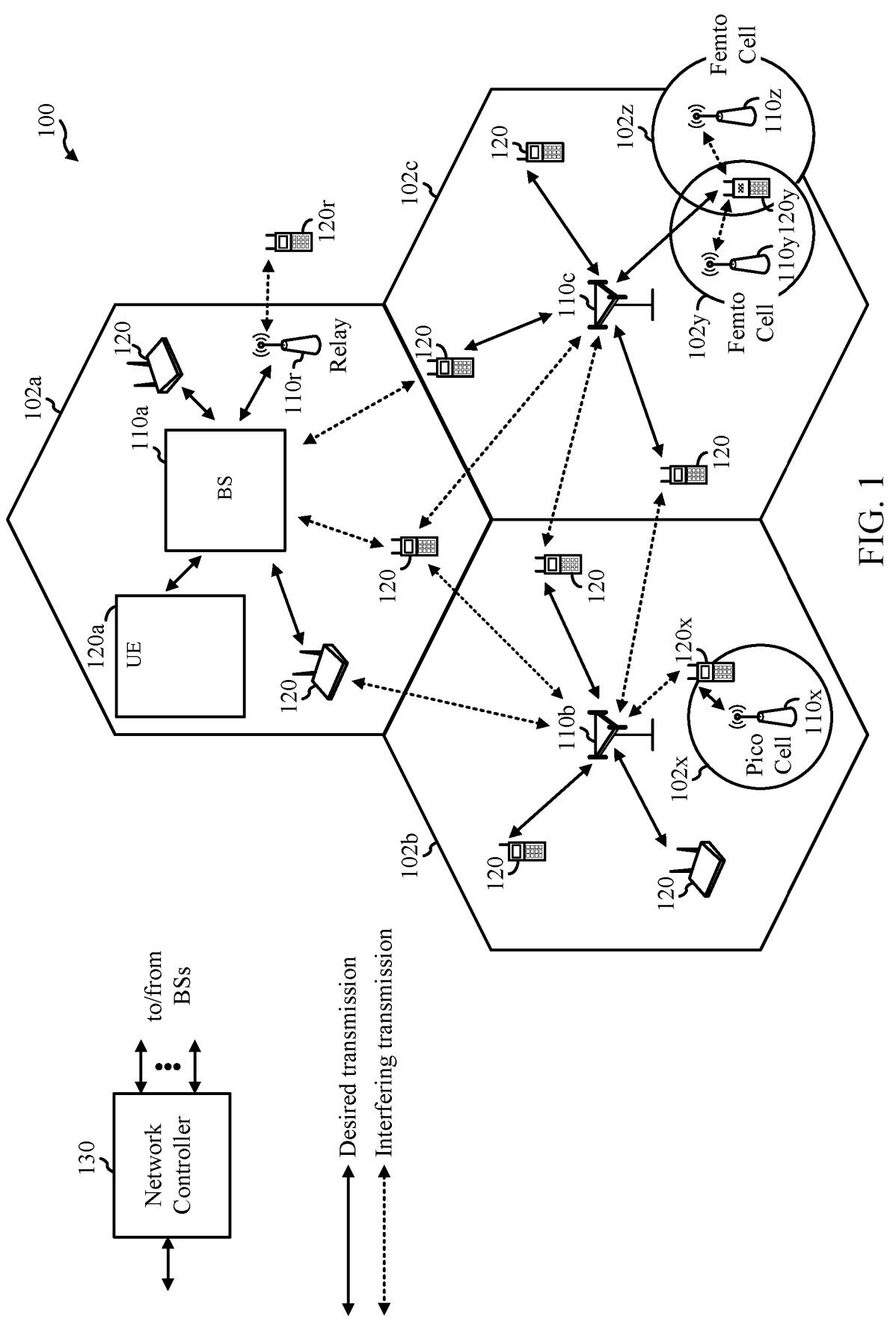
FIG. 1 is a block diagram conceptually illustrating an example telecommunications system, in accordance with certain aspects of the present disclosure.

Aspects of the present disclosure provide apparatus, methods, processing systems, and computer readable mediums for coordinating a sidelink discontinuous reception (DRX) mode between UEs.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120a may be configured to perform operations 800 and 900 described below with reference to FIGS. 8 and 9 to coordinate a remote UE sidelink DRX configuration.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
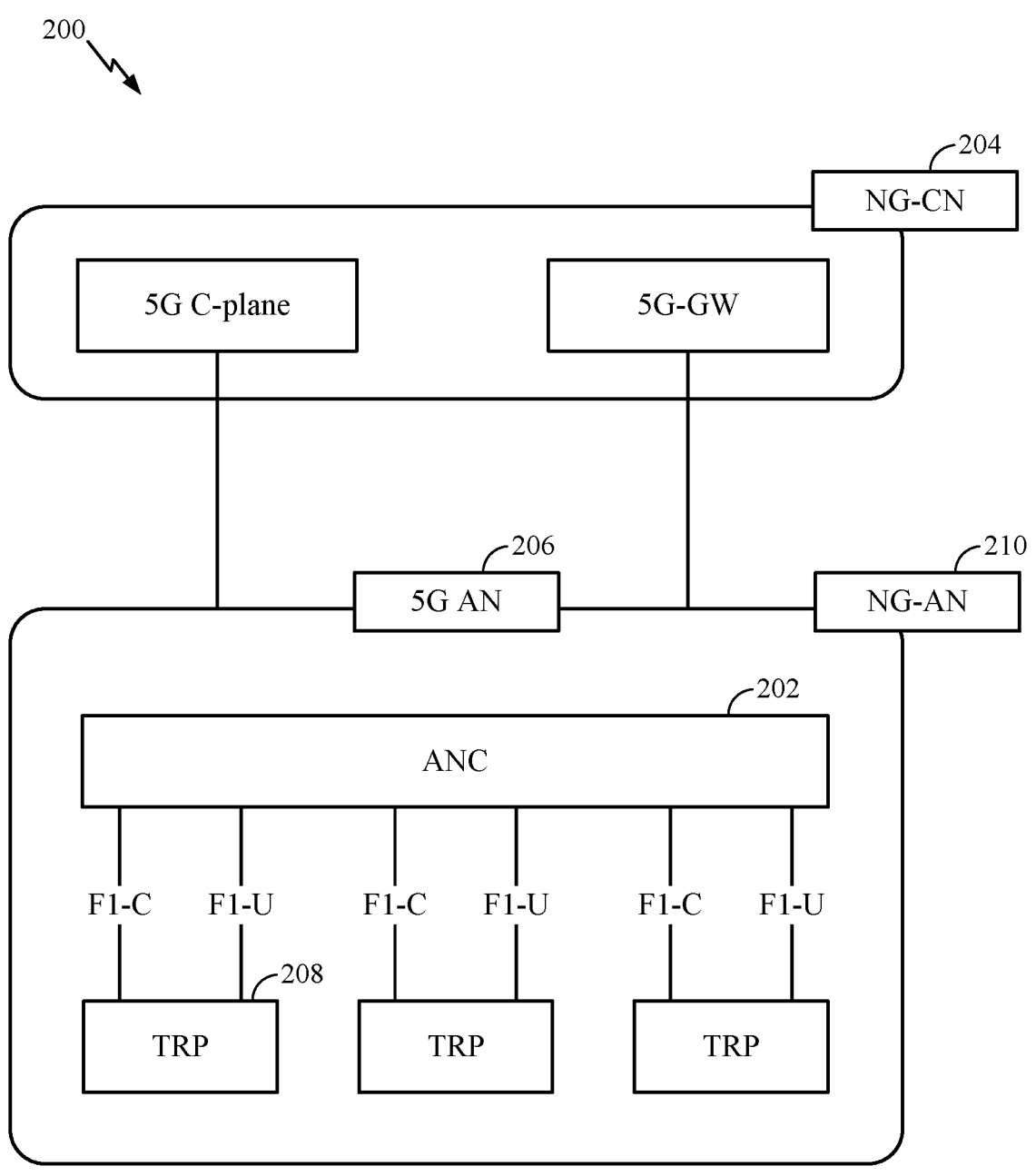
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
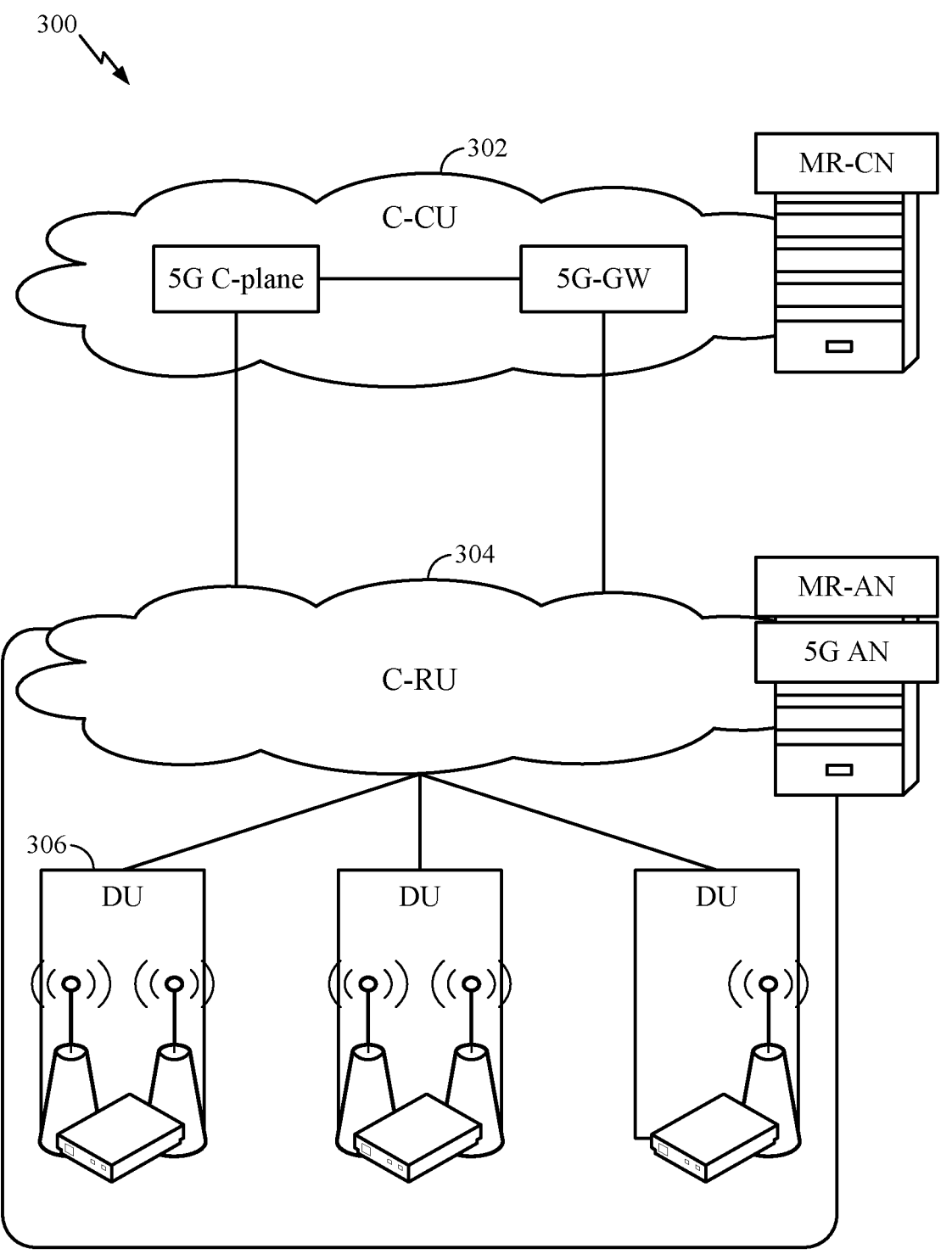
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
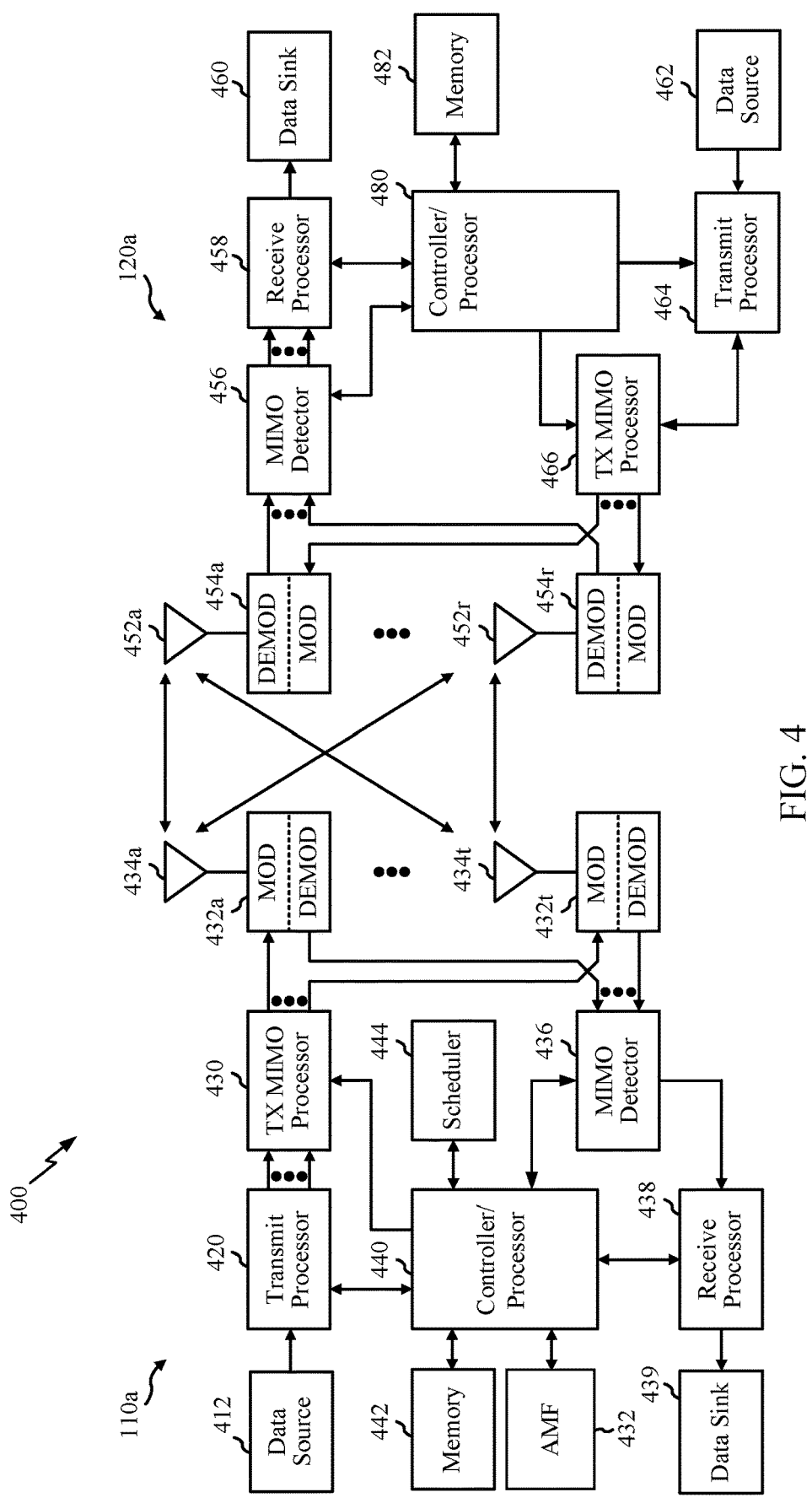
FIG. 4 is a block diagram conceptually illustrating a design of an example base station (B S) and user equipment (UE), in accordance with certain aspects of the present disclosure.

FIG. 4 illustrates example components of B S 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIGS. 8 and 9.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein with reference to FIGS. 11, 12, and 13.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to Sidelink NW Relay

Figure 5:
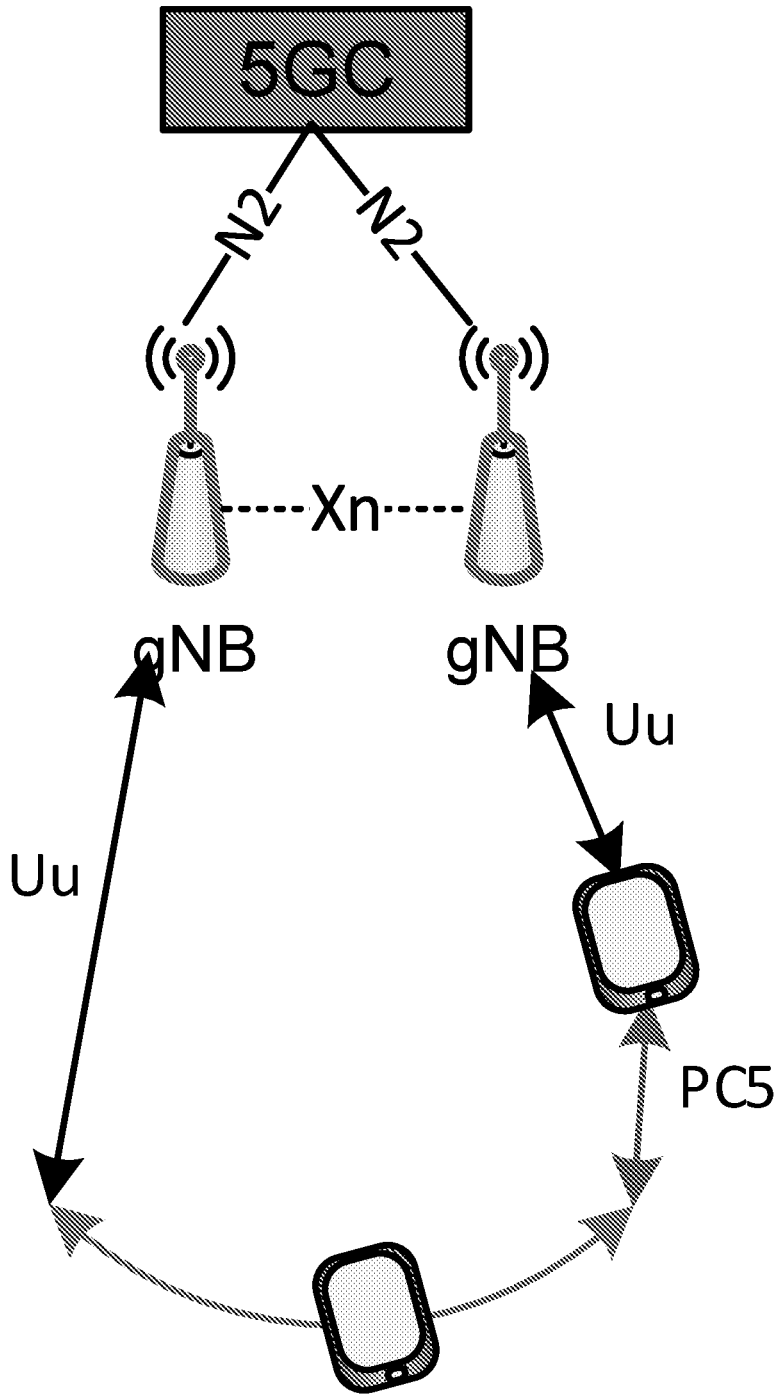
FIG. 5 is a high level path diagram illustrating example connection paths of a remote user equipment (UE), in accordance with certain aspects of the present disclosure.

One example use for sidelink communication involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
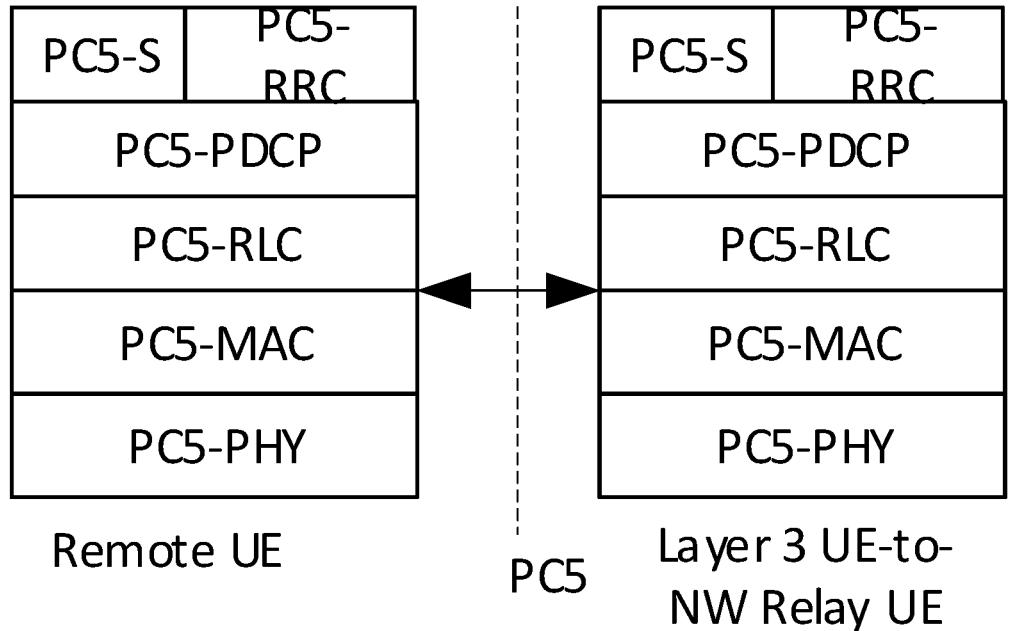
FIG. 6 is an example block diagram illustrating a control plane protocol stack on L3, when there is no direct connection path between the remote UE and the network node, in accordance with certain aspects of the present disclosure.
Figure 7:
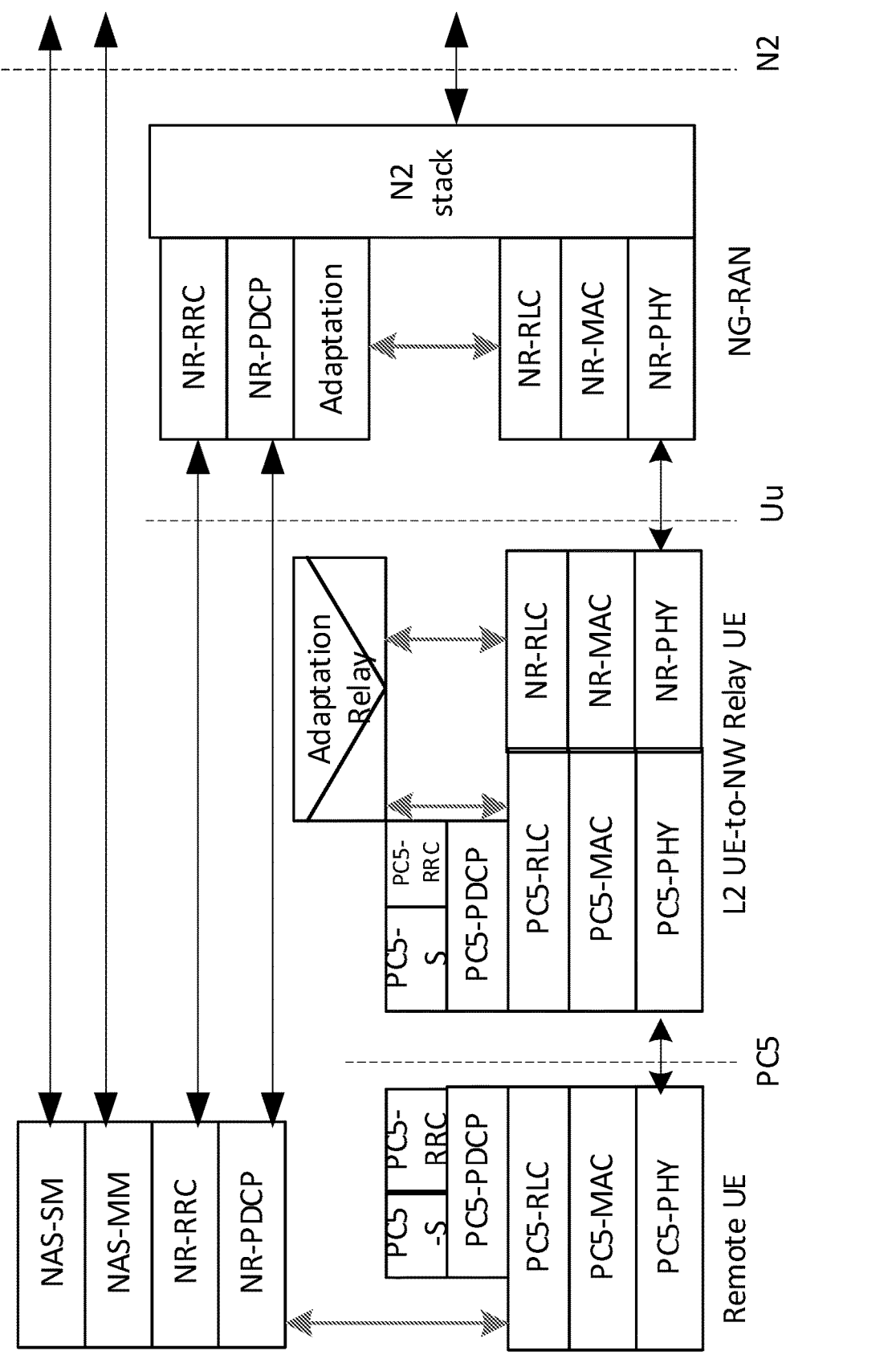
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Example Non Periodic C-DRX Schedule for SideLink Communications

Various procedures and functionalities may need to be supported for systems that utilize sidelink communications. One example of such a procedure and functionality is sidelink discontinuous reception (DRX).

Sidelink DRX modes may be used for broadcast, groupcast, and unicast operations. DRX configurations define on-durations and off-durations for sidelinks and specify the corresponding UE procedure. Aspects of the present disclosure may provide a mechanism that may help align sidelink DRX wake-up times among UEs (remote and relay UEs) communicating with each other and/or to align sidelink DRX wake-up times with Uu DRX wake-up times for in-coverage UEs.

In NR Rel-15, DRX mechanisms are similar to LTE DRX mechanisms. Both are MAC entities. But in LTE, the time units of DRX parameter are slots, while in NR time units are absolute time (ms). In NR, the hybrid automatic repeat request (HARD) round trip time (RTT) timer starts after PUSCH transmission or PDSCH reception, while in LTE, this timer starts after PDCCH reception.

In Rel-16, various changes related to NR DRX were introduced. First, DRX configurations can be per frequency range (FR, such as FR1/FR2). Further, for power savings, a UE assistance information (UAI) was introduced on a preferred C-DRX configuration, which may include long DRX cycles, short DRX cycles, a DRX inactivity timer or, short DRX cycle timer. Further, wake up signals (WUS) were also introduced, for example, that indicate whether a UE should actually wake up during a DRX on duration.

In a C-DRX mode, a UE wakes up and transmits and/or receives (TX/RX) data packets following C-DRX cycle (during a C-DRX ON period). This type of C-DRX mode has been used many years and is still default behavior of some NR networks and UEs.

This typical DRX mechanism may work sufficiently well for 5GC, for a RAN gNB, and UE communications. Current DRX mechanisms may be less than optimal for sidelink communications. For sidelink D2D communications, conventional DRX mechanisms with periodic cycles may lead to greater UE power consumption and unnecessary data latency.

For example, with periodic C-DRX cycles, a UE may wake up frequently even when it has no data to transmit and/or to monitor for data (e.g., indicated by a page), which wastes UE power. Enlarging a C-DRX cycle may wake up less often, but this will lead to increased data service latency.

Aspects of the present disclosure, however, may provide for greater flexibility in sidelink C-DRX modes. For example, by allowing one UE to assign non-periodic C-DRX occasions, time between C-DRX occasions may be shortened when possible (e.g., when data is available to transmit or receive), avoiding increases to data service history. On the other hand, the time between C-DRX occasions may be lengthened when possible (e.g., when data is not available to transmit or receive), which may help a UE to stay in a low power state longer, thereby reducing power.

Figure 8:
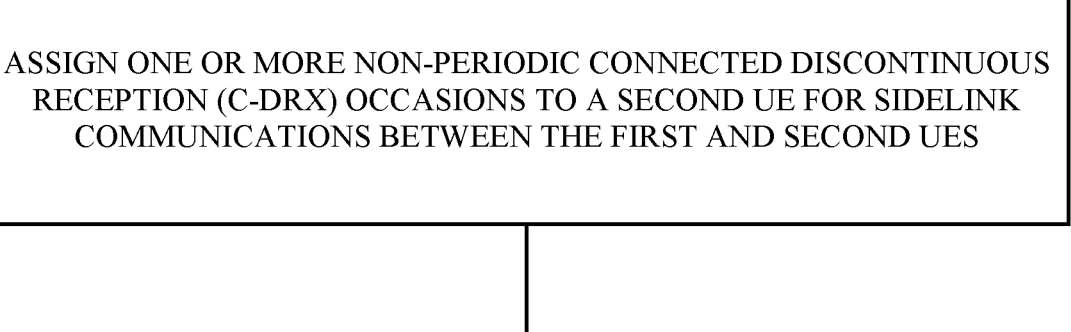
FIG. 8 is a flow diagram illustrating example operations that may be performed by a first UE, in accordance with certain aspects of the present disclosure.

FIG. 8 illustrates example operations 800 that may be performed by a first UE to coordinate a sidelink DRX configuration in accordance with aspects of the present disclosure. Operations 800 may be performed, for example, by a UE 120 of FIG. 1 or FIG. 4.

Operations 800 begin, at 802, by assigning one or more non-periodic connected discontinuous reception (C-DRX) occasions to a second UE for sidelink communications between the first and second UEs. At 804, the first UE exits from a reduced power state in accordance with the assigned one or more non-periodic C-DRX occasions to engage in sidelink communications from the second UE.

FIG. 9 illustrates example operations 900 that may be considered complementary to operations 800 of FIG. 8. For example, operations 900 may be performed by a second UE to receive and process non-periodic C-DRX occasions for sidelink communication assigned by another UE performing operations 800 of FIG. 8.

Operations 900 begin, at 902, by receiving signaling, from a first UE, comprising an assignment of one or more non-periodic connected discontinuous reception (C-DRX) occasions to the second UE for sidelink communications between the first and second UEs. At 904, the second UE exits from a reduced power state in accordance with the assigned one or more non-periodic C-DRX occasions to engage in sidelink communications with the first UE.

In some cases, the first UE (e.g., UE-A) will assign one or more next Non-Periodic specific C-DRX TX/RX occasions occurring in time to the second/peer UE (e.g., UE-B). As an example, UE-A may assign values of: 120 ms, 200 ms, and 210 ms to UE-B, as the next C-DRX TX/RX occasion.

Assuming the non-periodic C-DRX occasions described above, UE-A and UE-B will wake up 120 ms later to transmit or receive (TX/RX) data packets (if UE-A or UE-B have any.

Again assuming the non-periodic C-DRX occasions described above, UE-A and UE-B will wake up 200 ms later again transmit or receive (TX/RX) data packets if any. Again assuming the non-periodic C-DRX occasions described above, UE-A and UE-B will wake up 210 ms later to TX/RX data packets, if any.

This assigned next C-DRX time can be single value. For instance, UE-A will assign UE-B 30 ms as next TX/RX occasion time. UE-A and UE-B will wake up 30 ms later.

UE-A has the authority to modify or update this C-DRX TX/RX occasion timelines to UE-B at any time when UE-A and UE-B are awake.

In some cases, if UE-A has not assigned any C-DRX TX/RX occasion times to UE-B, UE-A and UE-B may use a default C-DRX cycle time. The UE-A assigned non-periodic C-DRX occasion time as it will take a higher priority to overwrite the default C-DRX cycle time.

Figure 10:
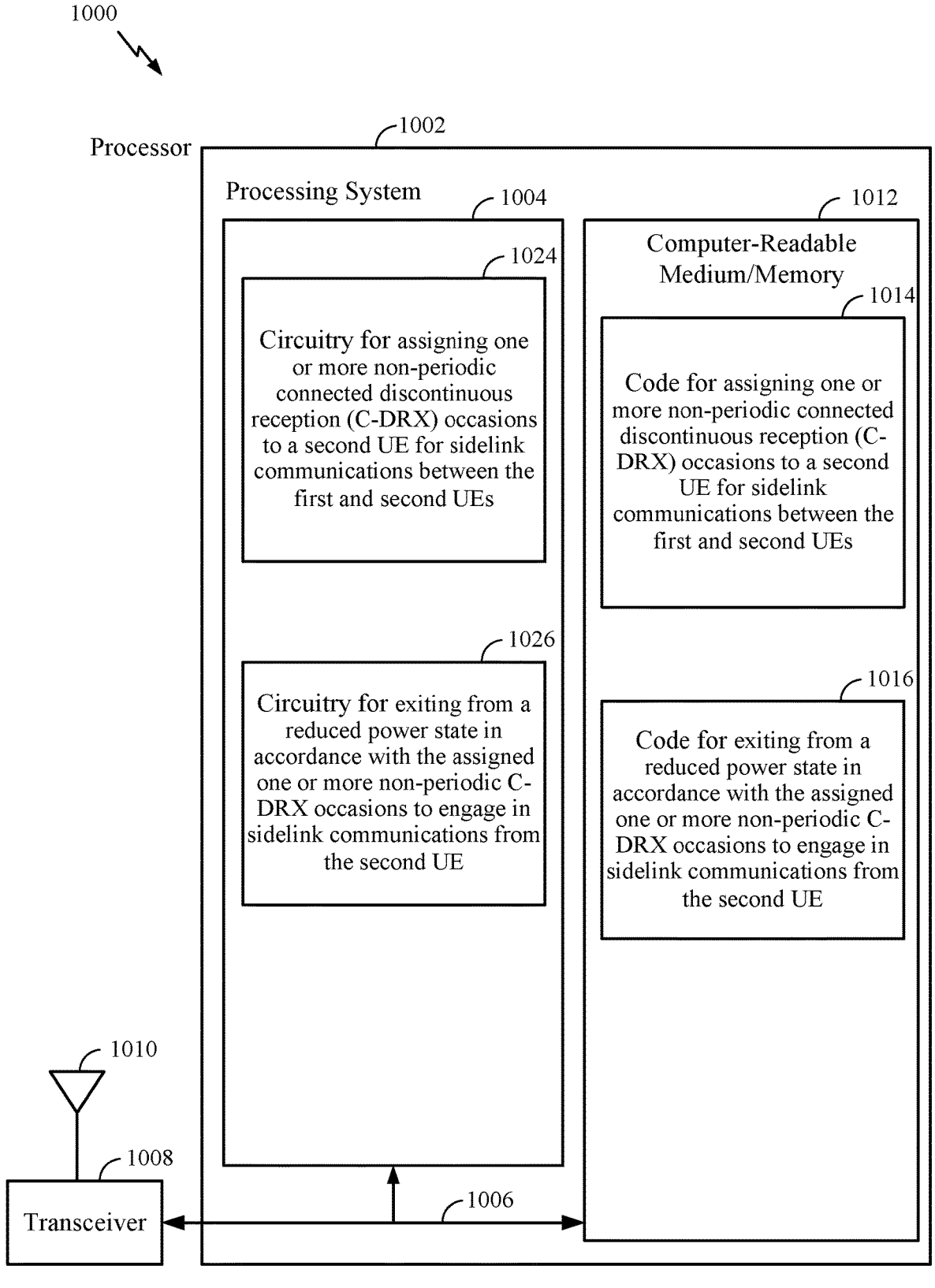
FIG. 10 illustrates a communications device that may include various components configured to perform the operations illustrated in FIG. 11, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8. In certain aspects, computer-readable medium/memory 1012 stores code 1014 for assigning one or more non-periodic connected discontinuous reception (C-DRX) occasions to a second UE for sidelink communications between the first and second UEs; and code 1016 for exiting from a reduced power state in accordance with the assigned one or more non-periodic C-DRX occasions to engage in sidelink communications from the second UE. In certain aspects, the processor 1004 has circuitry configured to implement the code stored in the computer-readable medium/memory 1012. The processor 1004 includes circuitry 1024 for assigning one or more non-periodic connected discontinuous reception (C-DRX) occasions to a second UE for sidelink communications between the first and second UEs; and circuitry 1026 for exiting from a reduced power state in accordance with the assigned one or more non-periodic C-DRX occasions to engage in sidelink communications from the second UE.

Figure 11:
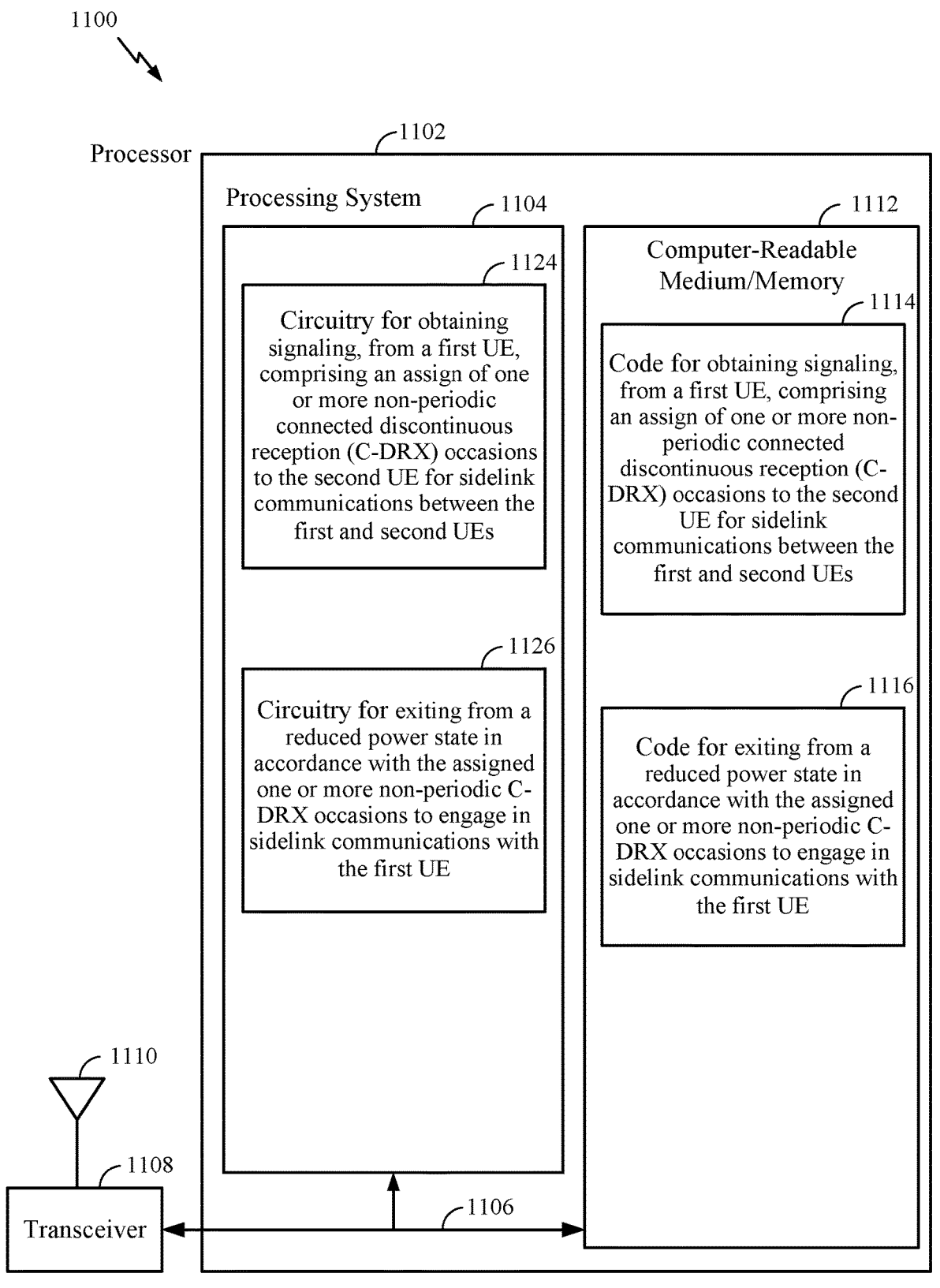
FIG. 11 illustrates a communications device that may include various components configured to perform the operations illustrated in FIG. 12, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1121 via a bus 1106. In certain aspects, the computer-readable medium/memory 1112 is configured to store instructions (e.g., computer-executable code) that when executed by the processor 1104, cause the processor 1104 to perform the operations illustrated in FIG. 9 or other operations. In certain aspects, computer-readable medium/memory 1112 stores code 1114 for obtaining signaling, from a first UE, comprising an assignment of one or more non-periodic connected discontinuous reception (C-DRX) occasions to the second UE for sidelink communications between the first and second UEs; and code 1116 for exiting from a reduced power state in accordance with the assigned one or more non-periodic C-DRX occasions to engage in sidelink communications with the first UE. In certain aspects, the processor 1104 has circuitry configured to implement the code stored in the computer-readable medium/memory 1112. The processor 1104 includes circuitry 1124 for obtaining signaling, from a first UE, comprising an assignment of one or more non-periodic connected discontinuous reception (C-DRX) occasions to the second UE for sidelink communications between the first and second UEs; and circuitry 1126 for exiting from a reduced power state in accordance with the assigned one or more non-periodic C-DRX occasions to engage in sidelink communications with the first UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 11, 12, and 13 may be performed by various processors shown in FIG. 4, such as processors 466, 458, 464, and/or controller/processor 480 of the UE 120*a*.

For example, means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for assigning, means for exiting, means for using and means for monitoring may include a processing system, which may include one or more processors, such as processors 466, 458, 464, and/or controller/processor 480 of the UE 120*a*.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11, 12, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
   assigning one or more non-periodic connected discontinuous reception (C-DRX) occasions to a second UE for sidelink communications between the first UE and the second UE, wherein:
      the one or more non-periodic C-DRX occasions being scheduled by the first UE, and
      each respective non-periodic C-DRX occasion of the one or more non-periodic C-DRX occasions comprises an individual time value at which the respective non-periodic C-DRX occasion is assigned to occur; and
   exiting from a reduced power state in accordance with the assigned one or more non-periodic C-DRX occasions to engage in sidelink communications with the second UE.

2. The method of claim 1, further comprising, during the assigned one or more non-periodic C-DRX occasions, at least one of:
   transmitting data packets to the second UE; or
   monitoring for data packets from the second UE.

3. The method of claim 1, wherein assigning the one or more non-periodic C-DRX occasions comprises assigning the one or more non-periodic C-DRX occasions via sidelink control information (SCI).

4. The method of claim 1, wherein assigning the one or more non-periodic C-DRX occasions comprises assigning the one or more non-periodic C-DRX occasions during a C-DRX on period.

5. The method of claim 1, further comprising using a default C-DRX cycle time to determine one or more C-DRX occasions for one or more periods when the first UE has not assigned any C-DRX occasion to the second UE.

6. The method of claim 5, wherein the assigned one or more non-periodic C-DRX occasions override the one or more C-DRX occasions determined using the default C-DRX cycle time.

7. A method for wireless communications by a second user equipment (UE), comprising:
   receiving signaling, from a first UE, comprising an assignment of one or more non-periodic connected discontinuous reception (C-DRX) occasions for sidelink communications between the first UE and the second UE, wherein each respective non-periodic C-DRX occasion of the one or more non-periodic C-DRX occasions comprises an individual time value at which the respective non-periodic C-DRX occasion is assigned to occur; and
   exiting from a reduced power state in accordance with the assigned one or more non-periodic C-DRX occasions to engage in sidelink communications with the first UE.

8. The method of claim 7, further comprising, during the assigned one or more non-periodic C-DRX occasions, at least one of:
   transmitting data packets to the first UE; or
   monitoring for data packets from the first UE.

9. The method of claim 7, wherein receiving the signaling comprises receiving the signaling via sidelink control information (SCI).

10. The method of claim 7, wherein receiving the signaling comprises receiving the signaling during a C-DRX on period.

11. The method of claim 7, further comprising using a default C-DRX cycle time to determine one or more C-DRX occasions for one or more periods when the first UE has not assigned any C-DRX occasion to the second UE.

12. The method of claim 11, wherein the assigned one or more non-periodic C-DRX occasions override the one or more C-DRX occasions determined using the default C-DRX cycle time.

13. A first user equipment (UE), comprising:
   a memory; and
   a processor coupled to the memory and configured to cause the first UE to:
      assign one or more non-periodic connected discontinuous reception (C-DRX) occasions to a second UE for sidelink communications between the first UE and the second UE, wherein:
         the one or more non-periodic C-DRX occasions scheduled by the first UE, and
         each respective non-periodic C-DRX occasion of the one or more non-periodic C-DRX occasions comprises an individual time value at which the respective non-periodic C-DRX occasion is assigned to occur; and
      exit from a reduced power state in accordance with the assigned one or more non-periodic C-DRX occasions to engage in sidelink communications with the second UE.

14. The first UE of claim 13, wherein, during the assigned one or more non-periodic C-DRX occasions, the processor is configured to cause the first UE to, at least one of:

transmit data packets to the second UE; or monitor for data packets from the second UE.

15. The first UE of claim 13, wherein to assign the one or more non-periodic C-DRX occasions, the processor is configured to cause the first UE to assign the one or more non-periodic C-DRX occasions via sidelink control information (SCI).

16. The first UE of claim 13, wherein to assign the one or more non-periodic C-DRX occasions, the processor is configured to cause the first UE to assign the one or more non-periodic C-DRX occasions during a C-DRX on period.

17. The first UE of claim 13, wherein the processor is further configured to cause the first UE to use a default C-DRX cycle time to determine one or more C-DRX occasions for one or more periods when the first UE has not assigned any C-DRX occasion to the second UE.

18. The first UE of claim 17, wherein the assigned one or more non-periodic C-DRX occasions override the one or more C-DRX occasions determined by the use of the default C-DRX cycle time.

19. A second user equipment (UE), comprising:

a memory; and a processor coupled to the memory and configured to cause the second UE to:

receive signaling, from a first UE, comprising an assignment of one or more non-periodic connected discontinuous reception (C-DRX) occasions for sidelink communications between the first UE and the second UE, wherein each respective non-periodic C-DRX occasion of the one or more non-periodic C-DRX occasions comprises an individual time value at which the respective non-periodic C-DRX occasion is assigned to occur; and exit from a reduced power state in accordance with the assigned one or more non-periodic C-DRX occasions to engage in sidelink communications with the first UE.

20. The second UE of claim 19, wherein, during the assigned one or more non-periodic C-DRX occasions, the processor is configured to cause the second UE to, at least one of:

transmit data packets to the first UE; or monitor for data packets from the first UE.

21. The second UE of claim 19, wherein to receive the signaling, the processor is configured to cause the second UE to receive the signaling via sidelink control information (SCI).

22. The second UE of claim 19, wherein to receive the signaling, the processor is configured to cause the second UE to receive the signaling during a C-DRX on period.

23. The second UE of claim 19, wherein the processor is further configured to cause the second UE to use a default C-DRX cycle time to determine one or more C-DRX occasions for one or more periods when the first UE has not assigned any C-DRX occasion to the second UE.

24. The second UE of claim 23, wherein the assigned one or more non-periodic C-DRX occasions override the one or more C-DRX occasions determined by the use of the default C-DRX cycle time.

\*   \*   \*   \*   \*